United States Patent [19]

Beaudoin

[11] Patent Number: 4,480,431
[45] Date of Patent: Nov. 6, 1984

[54] RAKE WITH TINE REINFORCING CHAIN

[75] Inventor: Albert L. Beaudoin, South Burlington, Vt.

[73] Assignee: Roger C. Blanchard, South Burlington, Vt.

[21] Appl. No.: 513,002

[22] Filed: Jul. 12, 1983

[51] Int. Cl.³ ............................................ A01D 77/00
[52] U.S. Cl. .................................................. 56/400.17
[58] Field of Search ............ 56/400.17, 400.18, 400.01

[56] References Cited

U.S. PATENT DOCUMENTS 2,210,784  8/1940  Tokunaga ........................ 56/400.17
2,488,802 11/1949  Canalizo .......................... 56/400.17

Primary Examiner—Jay N. Eskovitz
Attorney, Agent, or Firm—Harvey B. Jacobson

[57] ABSTRACT

An elongated handle is provided having first and second ends and a generally fan-shaped multi-tine head is supported from the first end of the handle and projects endwise outwardly therefrom. The tine head includes a plurality of elongated tines anchored relative to each other and the first end of the handle at one set of corresponding tine ends and the tines diverge outwardly toward the other set of tine ends which are disposed, generally, in the same plane. The other or free ends of the tines include similar laterally directed terminal ends disposed transverse to the aforementioned plane and elongated transverse connecting and bracing structure extends between and interconnects the tines centrally intermediate the terminal ends thereof and the ends anchored relative to the handle. Debris movement limiting structure is connected between adjacent terminal end portions of the tines and spaced from the free ends thereof. The debris movement limiting structure interconnects adjacent terminal ends for limited lateral shifting, only, relative to each other and functions to prevent movement of debris impaled by the free ends of the tines upwardly along the tines past the debris movement limiting structure.

3 Claims, 3 Drawing Figures

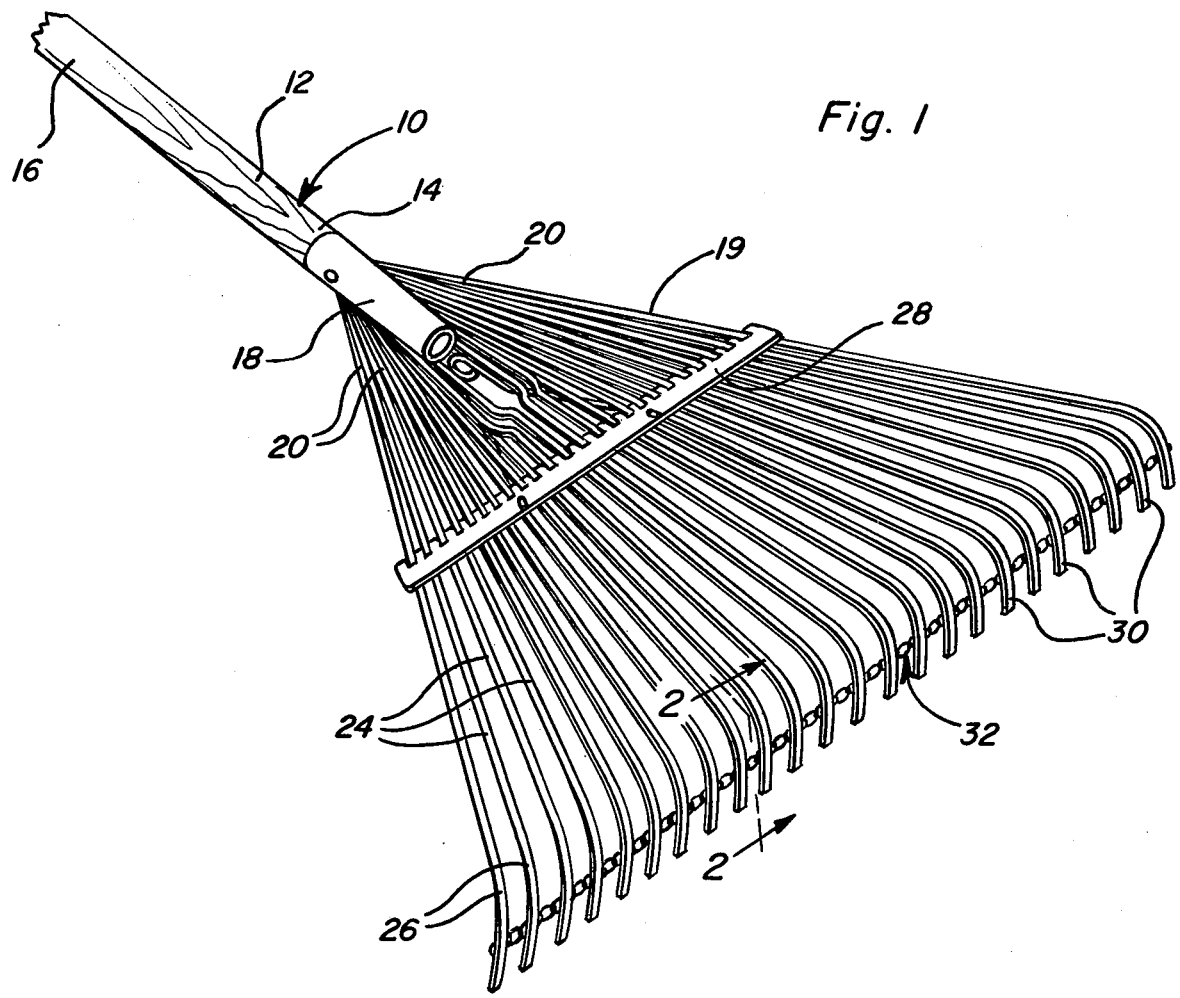
Fig. 1
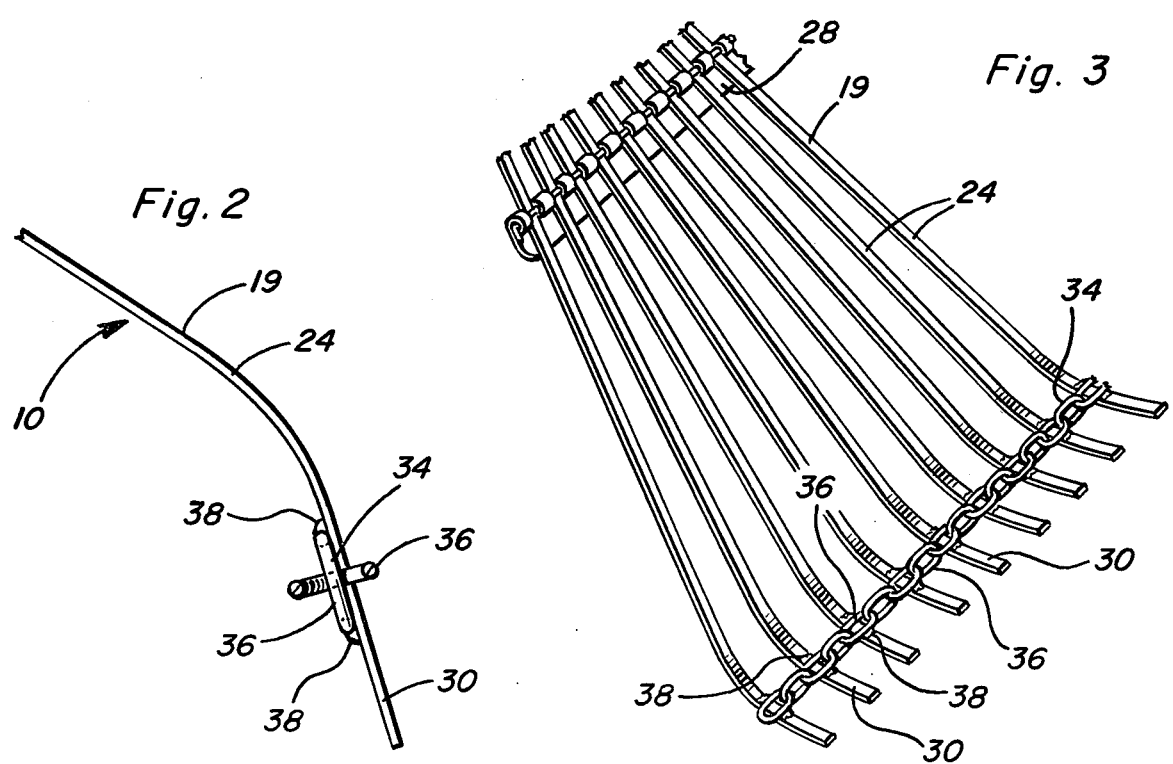
Fig. 2
Fig. 3

RAKE WITH TINE REINFORCING CHAIN

BACKGROUND OF THE INVENTION

Fan-shaped rakes of either metal or bamboo construction and which include laterally spaced tines having similarly laterally directed free ends have long been used for raking grass, leaves and other garden or lawn debris. These types of rakes as well as similar rakes including parallel tines are quite effective. On the other hand, when such rakes are used to rake leaves the free ends of the laterally directed terminal ends of the rake tines tend to impale leaves with the result that leaves build up on the laterally directed terminal ends of the tines and greatly reduce the "raking" capacity thereof.

In addtion, although the aforementioned types of rakes include transverse bracing structure extending and connected between longitudinal mid-portions of the tines, when raking leaves individual tine free end portions are sometimes excessively laterally deflected relative to adjacent tines with the result that the tines become bent or otherwise damaged.

Accordingly, a need exists for an improved form of rake wherein the laterally directed terminal ends of the tines thereof may be yieldingly braced relative to each other and structure may be provided for preventing excessive buildup of leaves on the tine terminal ends as a result of leaves being impaled by the terminal ends.

Examples of basic rake structures including some of the general structural and operational features of the instant invention are disclosed in U.S. Pat. Nos. 1,200,160, 2,222,163 and 2,603,058.

BRIEF DESCRIPTION OF THE INVENTION

The rake of the instant invention is fan-shaped including tines which diverge slightly toward the free ends thereof. However, the improvement comprising the instant invention may also be readily adapted to similar rakes including parallel tines.

The laterally directed free ends of the tines of the rake of the instant invention are interconnected by a chain having every other link secured to a corresponding tine in any convenient manner such as by welding, bracing or epoxy and every other chain link disposed between chain links secured to tines are loosely engaged with the adjacent tine mounted links and thereby enable limited lateral displacement between adjacent tines but prevent upward movement of leaves or other debris along the tine terminal ends as a result of the latter impaling the leaves or other debris.

Although a link chain has been used to interconnect the laterally directed terminal ends of the tines of the instant invention with every other link being fixed relative to a corresponding tine, other connecting and bracing structure may be used, as long as a continuous lateral connection between adjacent tine terminal ends is provided and adjacent tine terminal ends may be laterally deflected a limited amount relative to each other.

The main object of this invention is to provide an improved rake construction whereby the flexible tines of a rake may be interconnected at the laterally directed terminal ends thereof for limited relative lateral movement.

Another object of this invention is to provide a rake in accordance with the preceding object wherein the connecting structure connected between adjacent tines defines a continuous connection between all of the tines of the rake and thereby prevents debris such as leaves impaled on the tine free ends from moving excessively upwardly along the tines.

Still another very important object of this invention is to provide a fan or similar type rake with additional tine bracing structure adjacent the laterally directed free terminal ends of the tines.

A final object of this invention to be specifially enumerated herein is to provide an improved rake construction in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a fan-type rake head constructed in accordance with the present invention;

FIG. 2 is an enlarged fragmentary vertical sectional view taken substantially upon the plane indicated by the section line 2—2 of FIG. 1; and FIG. 3 is a fragmentary perspective view of the underside portion of the rake head.

DETAILED DESCRIPTION OF THE INVENTION

Referring now more specifically to the drawings the numeral 10 generally designates a rake constructed in accordance with the present invention. The rake 10 includes a handle 12 having a first end 14 and a second end 16. The first end 14 has a tapered tubular ferrule 18 secured thereon supporting a fan-shaped head 19 including the base end portions 20 of a plurality of spring tines 24 anchored relative to the ferrule 18. The tines 24 diverge toward the free end portions 26 thereof and an elongated transverse bracing structure 28 extends between and interconnects longitudinal mid-portions of the tines 24.

The tines 24 are arranged in a fan-type pattern wherein the tines 24 diverge toward their free end portions 26 and the free end portions 26 include similarly laterally directed terminal end portions 30 which are disposed in substantially the same plane arranged transverse to a plane containing the base end portions of the tines.

The foregoing may be considered as descriptive of a conventional rake. The rake 10 distinguishes from a conventional rake in that debris movement limiting structure referred to in general by the reference numeral 32 is interconnected between the laterally directed terminal end portions 30 of the tines 24.

The debris movement limiting structure comprises a link chain section 34 including interconnected chain links 36 and from FIG. 3 of the drawings it may be seen that every other link 36 is secured to a corresponding terminal end portion 30 in any convenient manner such as by welding 38. Of course, those links 36 anchored to terminal end portions 30 may be anchored thereto by other means such as by brazing or epoxy cement, or those links 36 anchored relative to terminal end portions 30 may be mechanically engaged with the corresponding terminal end portions 30 by means of clips or other attaching structure carried thereby.

The link chain section 34 functions to interconnect and relatively brace the terminal end portions 30 for only limited lateral movement relative to adjacent terminal end portions 30 and further comprises structure which prevents lawn debris such as leaves which are impaled by the free ends of the terminal end portions 30 from moving excessively upwardly along the terminal end portions 30. Thus, the raking ability of the rake 10 may be only slightly impaired by a collection of leaves on the terminal end portions 30.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A rake including an elongated handle having first and second ends, a generally fan-type multi-tine head supported from said first end and projecting outwardly therefrom, said tine head including a plurality of elongated tines anchored relative to each other and said first end at one set of corresponding ends thereof and with said tines diverging outwardly toward the other set of corresponding ends thereof with said other ends being disposed, generally, in the same plane, said other ends including similar laterally directed terminal ends disposed transverse to said plane, elongated transverse connecting and bracing means extending between and interconnecting said tines centrally intermediate said terminal ends and said one set of corresponding ends, and debris movement limiting means connected between adjacent terminal end portions and spaced from the free ends thereof interconnecting adjacent terminal end portions for limited lateral shifting, only, relative to each other and preventing movement of debris impaled by said free ends upwardly along said tine terminal end portions past said debris movement limiting means, said debris movement limiting means including a link chain section extending transversely of said terminal end portions, selected links of said link chain section being anchored relative to said terminal end portions, at least one link of said link chain section being disposed between each pair of adjacent selected links of said link chain section anchored relative to said terminal end portions.

2. The rake of claim 1 wherein said selected links are stationarily anchored relative to said terminal end portions.

3. The rake of claim 1 wherein said selected links comprise every other links of said link chain section.

* * * * *